United States Patent [19]
Sato et al.

[11] 3,813,532
[45] May 28, 1974

[54] METHOD AND APPARATUS FOR INTEGRATING THE OUTPUT OF A MEASURING INSTRUMENT

[75] Inventors: Tatsuo Sato; Shingo Takimoto, both of Kyoto, Japan

[73] Assignee: Shimadzu Seisakusho Ltd., Kyota, Japan

[22] Filed: Nov. 3, 1972

[21] Appl. No.: 303,417

[30] Foreign Application Priority Data
Nov. 10, 1971   Japan.............................. 46-89647

[52] U.S. Cl.............. 235/183, 235/151.35, 328/127
[51] Int. Cl.............................................. G06g 7/18
[58] Field of Search.......... 235/183, 151.35, 92 NT; 328/127, 162, 165

[56] References Cited
UNITED STATES PATENTS

| | | | |
|---|---|---|---|
| 3,185,820 | 5/1965 | Williams et al. ............... | 235/151.35 |
| 3,333,090 | 7/1967 | Neer ............................ | 235/151.35 |
| 3,412,241 | 11/1968 | Spence et al. ................. | 235/151.35 |
| 3,470,367 | 9/1969 | Frisby et al. .................... | 235/151.35 |
| 3,511,979 | 5/1970 | Rabe et al. .......................... | 235/183 |
| 3,555,260 | 1/1971 | Karohl .............................. | 235/183 |

*Primary Examiner*—Felix D. Gruber
*Attorney, Agent, or Firm*—Fidelman, Wolffe, Leitner & Hiney

[57] ABSTRACT

Method and apparatus for integrating the output of a measuring instrument, in which a plurality of check points of each peak in the output are detected to produce a time signal which lasts a predetermined period of time, so that if one of the check points is detected within the time period caused by the detection of the previous check point, the peak is treated as a noise peak. Whether or not a peak being detected is a noise peak superimposed on the signal peak of the measured output is determined by whether the end point or the apex of the peak exceeds a predetermined level.

14 Claims, 11 Drawing Figures

Fig. 8

METHOD AND APPARATUS FOR INTEGRATING THE OUTPUT OF A MEASURING INSTRUMENT

This invention relates to a method and apparatus for integrating the output of a measuring instrument and more particularly, to a method and apparatus for integrating the area of a peak in the output curve produced by a measuring instrument such as a chromatograph in measurement of a sample.

Generally, the result of measurement by a chromatograph is indicated as a graphical curve including various peaks corresponding to the components of the sample being measured. For quantititative analysis of the components by a chromatograph, it is necessary to measure or integrate the areas of the peaks in the chromatogram expressing the various components. In this case, integration must be performed not continuously on the whole area under the output curve of the measuring instrument but individually on the peaks alone, and for automatic integration of the area of each peak, it is necessary to automatically detect the start point and the end point of the peak the area of which is to be measured.

One method of detecting the start and end points of a peak is to differentiate the output of the measuring instrument so that the point on the output curve where the differential coefficient exceeds a predetermined positive value is considered as the start point of a peak and the point on the curve where the differential coefficient becomes greater (or the absolute value thereof becomes smaller) than a predetermined negative value is considered as the end point of the peak. However, the output of the measuring instrument necessarily contains noise. The noise which has a higher frequency may be removed by a filter. However, the noise which has a frequency close to that of the signal expressing a measured value cannot be removed by a filter but is mixed with the signal. Therefore, the above method of integration would introduce errors into the result of measurement.

If a noise peak appears in an independent form, an automatic integrator calculates the area of the noise peak. Generally, however, the area of a noise peak is far smaller than the area of a signal peak to be measured. Therefore, if the integrated value is lower than a predetermined level, the value may be considered as resulting from noise so as to be removed from the record. However, a difficult problem will arise if a noise peak appears superimposed on a signal peak. To the best knowledge of the present inventors there are no known methods or systems for effectively removing such a superimposed noise from a signal.

Accordingly, it is one object of the invention to provide a method and apparatus for integrating the output of a measuring instrument, which is capable of eliminating the adverse effect of noise on the result of measurement.

The measured output of a liquid chromatograph contains so much noise that it has been impossible to accomplish automatic integration of the output. Another object of the invention is therefore to provide a method and apparatus for use in a chromatograph which enables automatic integration of the peaks in the measured output of the instrument.

The invention will be explained in detail with reference to the accompanying drawings, wherein:

FIG. 8 is an electrical block diagram of an embodiment of the apparatus of the invention;

Figure 1:
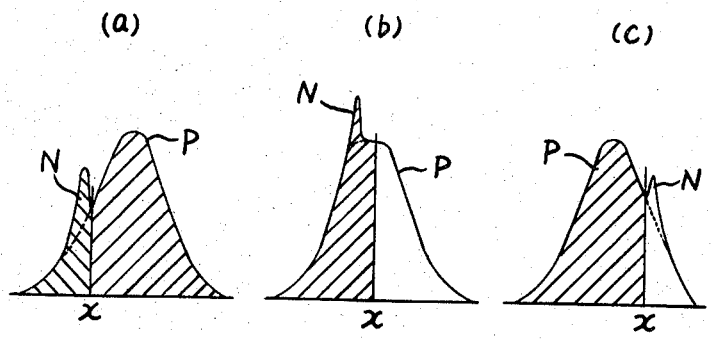
FIGS. 1 and 2 are graphs illustrating the effect of noise on the output of a measuring instrument.

Now referring in detail to the drawings, first to FIG. 1(a), suppose that the output of a chromatograph measuring a sample draws a peak P on the rising slope of which a noise peak N is superimposed. If the arrangement is such that integration is started when the start point of a peak is detected and ends when the end point thereof is detected, when the valley point X between the two peaks N and P is detected, it is mistaken for an end point so as to terminate the integration that has until then been conducted, and then integration is newly started at the rising slope of the peak P. In other words, the single peak P is integrated as two peaks divided at X. The result of measurement will then indicate that there are two peaks where actually a single peak P exists.

Similarly in FIG. 1(b) wherein a noise peak N is on top of a signal peak P and in FIG. 1(c) wherein a noise peak N is on the descending slope of a signal peak P, the end piont X of the noise peak N is mistaken for the end point of the peak P, so that the integration is stopped at point X. Then the integrated area of the peak P will be far smaller than the actual area thereof.

Figure 2:
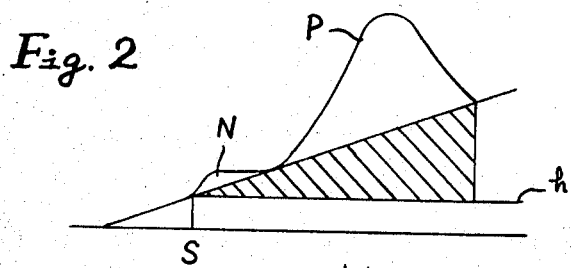

If, as shown in FIG. 2, the output of a chromatograph is drifting with a noise peak N having a tail of a gentle slope appearing before a signal peak P, although the start point S of the peak N can be detected, the end point thereof cannot be detected, so that the integration that started at the point S continues till the end point of the peak P is detected. If the arrangement is such that when integration has started, correction of the baseline is stopped, integration is performed on the area under the two peaks and above a horizontal line $h$ passing the point S. Then the integrated area which comprises the actual area of the peak P and the triangular area therebelow indicated by hatching will be erroneously expressed as the area of the peak P.

The method and apparatus of this invention have succeeded in eliminating errors caused by noise from the result of integration of the output of a measuring instrument.

In accordance with the invention, in a peak of the output curve of a measuring instrument there are selected a plurality of check points, for example, the start point, the apex and the end point of the peak. When one of the check points, say, the start point has been detected, a time signal is produced lasting a predetermined period of time, and if a succeeding check point, say, the apex is detected while that time signal caused by the preceding check point still exists, that peak is considered as a noise peak so that the result of the integration that has been proceeding until then is cancelled.

Figure 3:
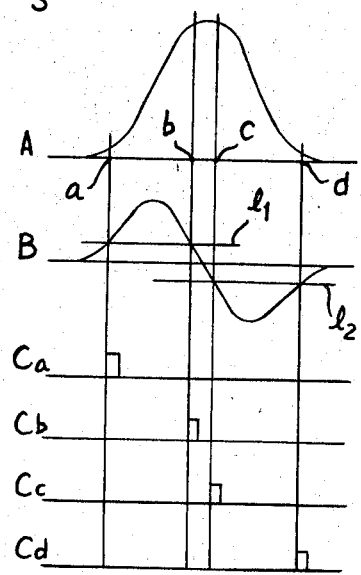
FIG. 3 is a graph of waveforms illustrating the principle of the invention.

The principle of the invention will now be described in further detail with reference to FIG. 3. The graph A shows a peak in the output curve of a measuring instrument and the graph B shows a derivative curve obtained by differentiating the curve A. In the graph B parallel lines $l_1$ and $l_2$ are drawn a predetermined distance above and below the horizontal axis. The points $a$, $b$, $c$ and $d$ in the graph A corresponding, respectively, to the point where the rising slope of the derivative curve in the graph B crosses the line $l_1$, the point where the descending slope of the curve B crosses the line $L_1$, the point where the descending slope of the curve B crosses the line $l_2$ and the point where the rising slope of the curve B crosses the line $l_2$ are selected as the start point $a$, the front apex $b$, the rear apex $c$ and the end point $d$ of the peak, respectively.

When these points are detected, signals $Ca$, $Cb$, $Cc$ and $Cd$ having a certain time of duration are produced. The pulse width of these signals is selected a little wider than the half peak width of noise. The peak width of noise varies but generally is fairly smaller than the peak widths of the signals corresponding to the measured values, so that by selecting the time signals $Ca - Cd$ to a proper width it is possible to have the half peak width of measured output signals greater than the width of these time signals and the maximum half peak width of noise that is expected to occur smaller than the width of the time signals.

Integration is started when the point $a$ is detected and terminated when the point $d$ is detected, so that the result of integration is recorded by means of a printer. However, if the following conditions occur, particular operations are performed.

Figure 4:
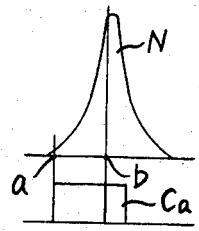
FIGS. 4 through 7 are graphs of waveforms illustrating the operation of the invention in different manners.

1. As shown in FIG. 4, if after detection of the point $a$, the point $b$ is detected while the signal $Ca$ still exists, the half width of the peak is smaller than the width of the signal $Ca$, so that the peak is determined as noise N and the integration that has been proceeding is cancelled.

Figure 5:
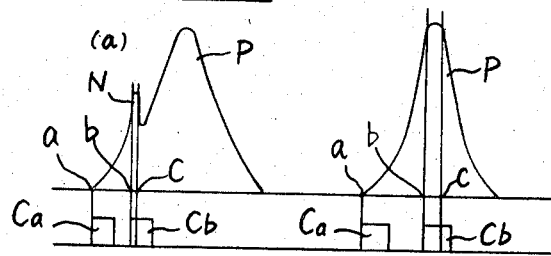

2. Suppose that after detection of the point $b$ the point $c$ is detected while the signal $Cb$ still lasts. There are two cases that fall under the condition. One is where a noise peak N superimposed on the rising slope of a signal peak S is being detected as shown in FIG. 5($a$), and the other is where a narrow signal peak P is being detected as shown in FIG. 5($b$). In these cases, the integration is continued.

Figure 6:
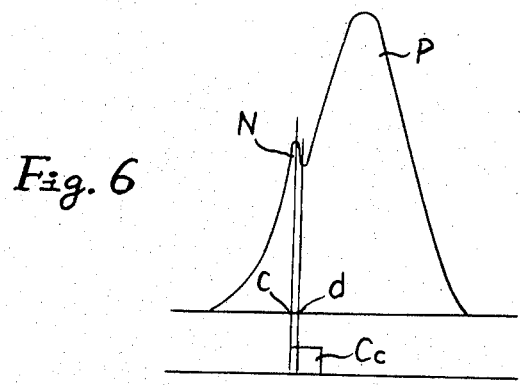

3. If the point $d$ has been detected while either the signal $Cb$ or $Cc$ exists as shown in FIG. 6, the point is recognized as the end point of a noise signal N so that the integration would have to be cancelled. Actually, however, the integration is continued, while the integration that has until then been conducted is not printed.

It sometimes happens that a point $a$ succeeding the point $d$ is detected while the signal $Cb$ or $Cd$ still exists. This condition implies that a noise peak is superimposed on the rising slope of a signal peak, and in this case the integration is continued.

Figure 7:
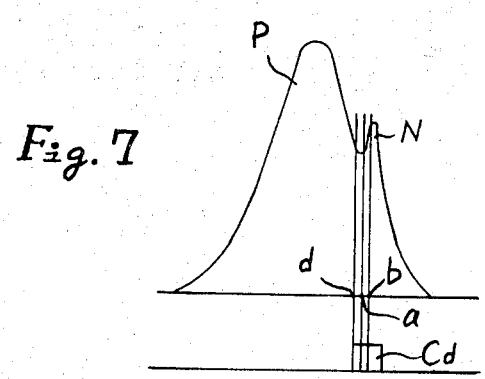

4. Suppose that while the signal $Cd$ exists after detection of the point $d$, the points $a$ and $b$ are successively detected as shown in FIG. 7. The condition indicates that a noise peak is on the descending slope of a signal peak, and the integration is continued.

The integration of the area of a single peak is terminated upon detection of the end point, and if no succeeding check point or the start point $a$ alone has been detected before the signal $Cd$ disappears, when the signal $Cd$ disappears, the result of the integration is recorded by means of a printer, and the device is ready for integration of a succeeding peak.

In the aove cases (2) – (4), a noise peak is on a signal peak and the area of the noise peak as well as that of the signal peak are integrated. However, such noise peaks are generally so small in comparison with signal peaks that the error introduced into the result of measurement by the inclusion of noise peaks is far smaller than if the integration is discontinued midway or influenced by fluctuation of the baseline.

Figure 8:
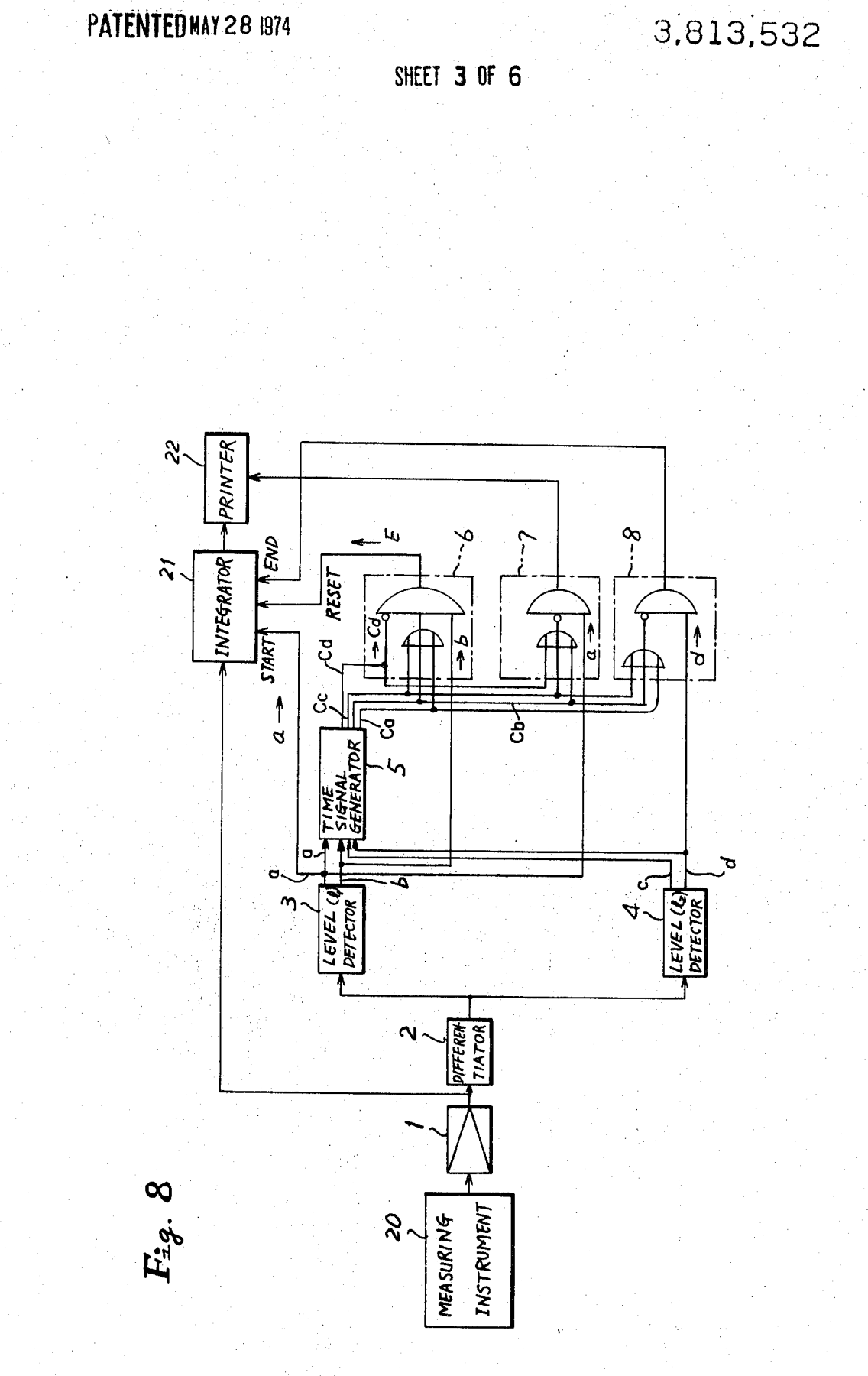

FIG. 8 shows by way of example an apparatus for carrying out the method of the invention. A measuring instrument 20 such as a chromatograph produces an output, which is applied to an amplifier 1. The amplified output is applied to an integrator 21 on the one hand, and differentiated by a differentiator 2 on the other. The output of the differentiator 2 is applied to a pair of level detectors 3 and 4. The detector 3 produces an output when the output of the differentiator 2 passes a preset positive level (indicated at $l_1$ in FIG. 3). The leading edge of the output of the detector 3 is used as a detection signal of the start point $a$ and the trailing edge of the output, as a detection signal of the front apex $b$. The detector 4 produces an output when the output of the differentiator 2 becomes lower than a preset negative level as indicated at $l_2$ in FIG. 3. The leading and trailing edges of the output of the detector 4 are used as the detection signal of the rear apex $c$ and the detection signal of the end point $d$, respectively. The level detectors 3 and 4 can be any prior art device which responds when a monitored signal exceeds a reference voltage and again responds when that monitored signal drops below the reference voltage. These detection signals which are also designated by $a$, $b$, $c$ and $d$, respectively, are applied to a time signal generator 5 which produces the previously mentioned signals $Ca$, $Cb$, $Cc$ and $Cd$. The width of these signals can be manually set to a desired period of time which, however, must be a little shorter than the minimum half width of all the signal peaks of the measured output values that are expected to occur in the output of the measuring instrument.

The output time signals $Ca - Cd$ of the time generator 5 are applied to integrator operating circuit 6, the output time signals $Cb - Cd$ are applied to integrator operating circuit 7, and the output time signals $Ca-Cc$ are applied to integrator operating circuit 8. The integrator operating circuits 6, 7 and 8 are gate circuits. The circuit 6 also receives the detection signal $b$ from the level detector 3. If the circuit 6 receives the signal $b$ while the time signal $Ca$ from the generator 5 is still existing on the circuit 6, the peak being detected is recognized as a noise peak, so that the circuit 6 produces a signal E which resets the integrator thereby cancelling the integration that has until then been being conducted.

The circuit 8 also receives the detection signal $d$ from the level detector 4. The signal $d$ is used to terminate the integration. However, the circuit 8 is an inhibit circuit to which the detection signals $Ca - Cc$ are applied as an inhibit signal. Therefore, if any of these detection signals is being applied to the circuit 8 when it has received the detection signal $d$, it is the end of a noise peak that has been detected, and the gate 8 is kept closed so that the integration is continued.

The circuit 7 receives the detection signals $Cb$, $Cc$ and $Cd$ from the signal generator 5 and the detection signal $a$ from the level detector 3. When the circuit 7 receives the signal $a$ in the absence of the signals $Cc - Cd$, it produces a signal to actuate a printer 22 to print the result of the integration that has been conducted.

In case a noise peak N is superimposed on the descending slope of a signal peak P as shown in FIG. 7, the end poind $d$ of the peak P is detected to terminate the integration and immediately thereafter the start point $a$ of the succeeding noise peak N is detected to resume the integration, and then the point $b$ of the noise peak is detected while the signal $Ca$ still continues. This would cancel the integration that has until then been conducted. To prevent this occuring, the time signal $Cd$ is applied as an inhibit signal to the inhibit circuit 6, so that if the detection signal $b$ is detected while the signal $Cd$ exists, the reset signal E is not produced so that the integration continues.

In this case, the detection signal $a$ of the noise peak N is produced while the signal $Cd$ caused by detection of the previous end point $d$ still lasts, so that the signal $Cd$ functions as an inhibit input to the circuit 7, which then produces no output signal to actuate the printer. In this way, the output curve shown in FIG. 7 is considered as comprising a single peak.

In the above example, the width of the time signals $Ca - Cd$ is preset to a value a little larger than the maximum half width of noise peaks that are expected to occur during the course of measurement. The width of these time signals may also be set to a value a little larger than the distance between the start and end points of a noise peak, so that if the end point $d$ has been detected while the signal $Ca$ caused by detection of the start point $a$ still exists, the peak is considered as a noise peak so as to cancel the integration that has until then been conducted. In this arrangement, the time signal $Cd$ in the previous embodiment may be dispensed with, since the end point of a noise peak on the descending slope of a signal peak is not detected so that no cancellation of the integration is effected.

Figure 9:
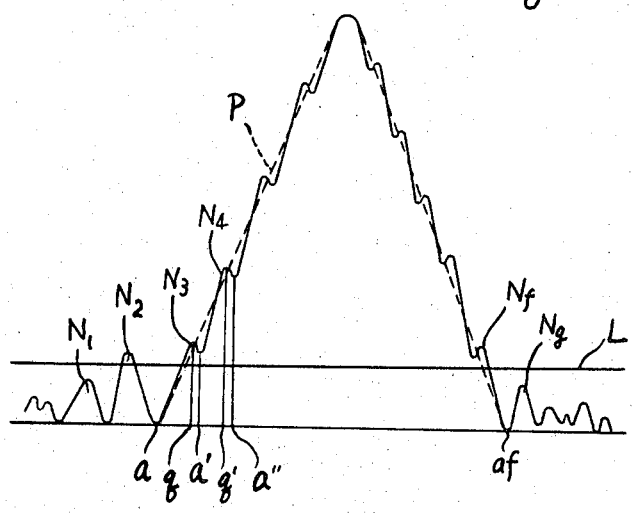
FIG. 9 is a graph showing the output of a measuring instrument, wherein a series of successively occurring noise peaks are superimposed on a signal peak.

Now turning to FIG. 9, on a single signal peak P there are superimposed a series of successive noise peaks N1, N2, ... Ng one occurring immediately after another. The noise peak N1 which occurs well in advance of the signal peak can be eliminated by the previously mentioned method and apparatus of the invention. A difficulty is encountered, however, when a noise peak like N3 happens to occur at the start point $a$ of the signal peak. In this case, with the previously mentioned arrangement integration is started at point $a$, and before the period of time provided by the time signal $Ca$ expires, the apex $q$ is detected so that the peak is determined as a noise peak and the integrator is reset to render the integrated value zero. Then the point $a'$ of the ensuing peak N4 is detected to start integration. However, the apex $q'$ of the peak is detected before expiration of the time signal $Ca$, so that the integrator is again reset to render the integrated value zero. The same is true with succeeding noise peaks. Thus so long as noise peaks successively occur, the area of the signal peak P cannot be integrated.

The problem can be solved by the following method of the invention. In FIG. 9 a level L is set so that even if the apex of a noise peak has been detected within a predetermined period of time after detection of the start point $a$ of the peak (in other words, before expiration of the time signal $Ca$ produced upon detection of the start point), the integration is not cancelled but continued provided that the peak exceeds the set level L. With this arrangement, the peak N3 exceeds the level L so that the integration that was started at the point $a'$ is not cancelled but continued. In similar manner, when the succeeding noise peaks N4, N5 ... are detected, the integration is continued so long as the peaks exceed the level L.

A noise peak like N2 which is not on a signal peak may sometimes exceed the set level L. In this case the area of this noise peak may have been integrated. However, since the area of a noise peak is generally very small as compared with the area of the signal peak, a level may be set such that if the integrated area of a peak is below the level, that peak may be considered as a noise peak so as to be omitted or cancelled from the record of measurement.

Figure 10:
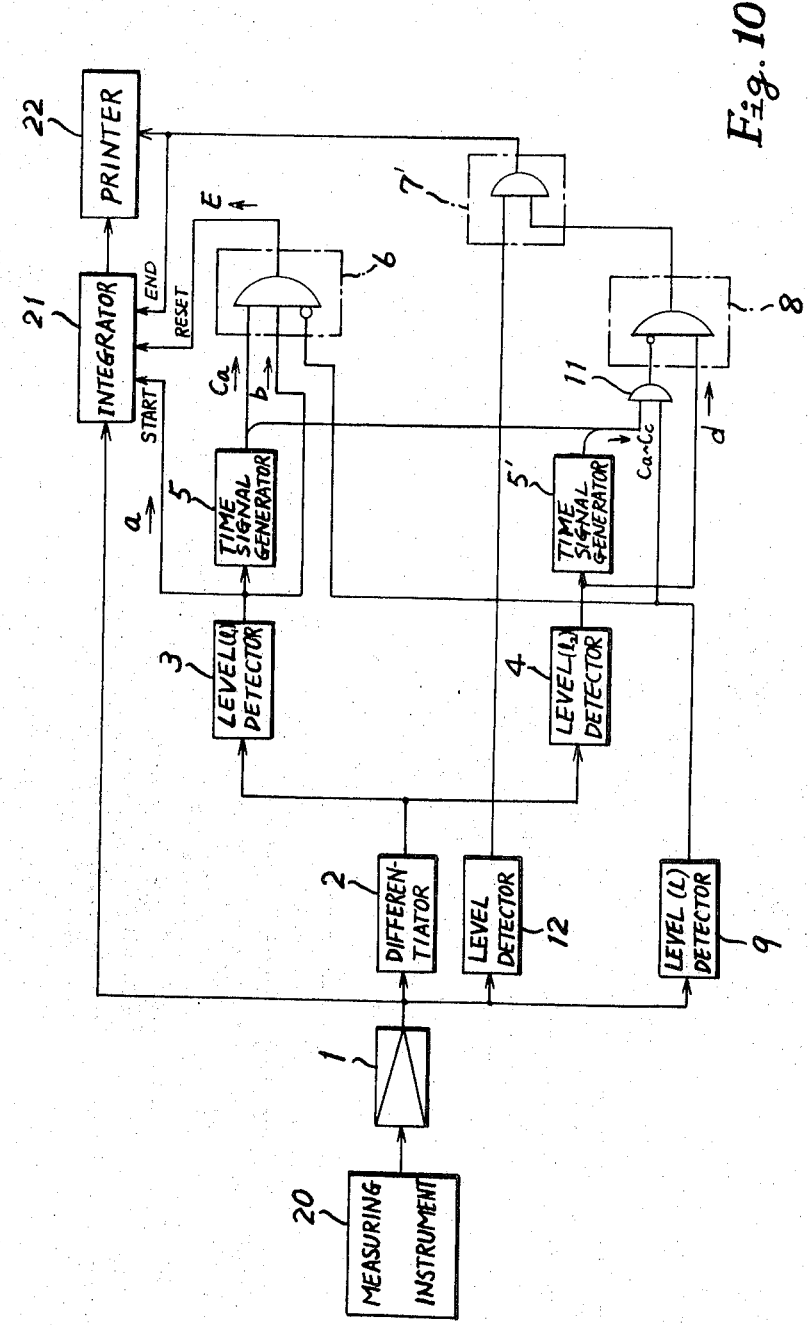
FIG. 10 is an electrical block diagram of another embodiment of the apparatus of the invention.

FIG. 10 shows an arrangement for embodying the principle shown in FIG. 9. Many of the component parts of the system of FIG. 10 are the same as that of FIG. 8, so that the same reference numerals and symbols are used to designate corresponding parts in both figures. The output of a measuring instrument 20 is applied through an amplifier 1 to a differentiator 2, the output of which is applied to level detectors 3 and 4. The level detector 3 produces detection signals $a$ and $b$ when the start point $a$ and the front apex $b$ of a peak in the output of the measuring instrument have been detected, respectively, and the level detector 4 produces detection signals $c$ and $d$ when the rear apex $c$ and the end point $d$ of the peak have been detected, respectively, in the same manner as in the previously mentioned embodiment.

The detection signals $a$ and $b$ produced in the form of a pulse trigger a time signal generator 5 such as a monostable multivibrator to produce time signals $Ca$ and $Cb$. The detection signal $c$ also in the form of a pulse triggers a similar time signal generator 5' to produce a time signal $Cc$. The detection signal $a$ is also applied to an integrator 21 to start its operation. The detection signal $b$ and the time signal $Ca$ are applied to an integrator operating circuit 6, which is a kind of an AND gate. When the gate 6 receives the signal $b$ while it is receiving the signal $Ca$, it produces a signal E to reset the integrator thereby cancelling the result of the integration that was started by the signal $a$. At this time the output of the amplifier 1 is being applied to a level detector 9. When the output exceeds the level L in FIG. 9, the detector produces an output to be applied as an inhibit signal to the gate 6, so that the signal E is not produced but the integrator continues its operation.

The integration is terminated by the detection signal $d$ produced upon detection of the end point of a peak. As previously mentioned, however, the integration should not be terminated between the adjacent noise peaks on the signal peak as shown in FIG. 9. To this end, another integrator operating circuit 8 which is also a gate is provided as in the previous embodiment of FIG. 8. When the gate 8 receives the detection signal $d$ alone, it produces an output to terminate the operation of the integrator. However, since the time signals Ca – Cc are applied as an inhibit signal to the gate 8, if these signals coincide with the detection signal d, the gate 8 produces no output, so that the integration is continued.

This arrangement, however, poses a problem if there are a series of successive noise peaks on the descending slope of a signal peak. Referring to FIG. 9, the integration should properly be terminated at the end point af of the signal peak or the noise peak Nf in order to obtain the correct area of the signal peak. However, a succeeding noise peak Ng appears immediately after the peak Nf and with the above arrangement, the presence of the peak Ng would prevent the integration from being properly terminated at point af.

To solve the problem the level detector 9 is also utilized. What is required to be done here is that the integration should be terminated at the end af of the noise peak Nf. To meet the requirement, the output of the level detector 9 is applied as one input to an AND gate 11, to which the time signals Ca – Cc are applied as the other input. When the output of the detector 9 has become lower than the level L, the gate 11 loses one input so that the signals Ca – Cc cannot pass the gate to reach the circuit 8. Under the condition, since no inhibit signal is applied to the gate 8, the signal d can pass the gate 8. With this arrangement, since the output of the level detector 9 becomes lower than the level L on the end portion of the signal peak, even if the end point af of the peak is detected (or the detection signal d is produced) within a predetermined period of time (time is the duration of the signal Cb or Cc after the detection of the apex of the peak Nf), the gate 8 is kept opened so that the detection signal d passes the gate.

The output of the gate 8 is applied as one input to an AND gate 7', to which the output of a level detector 12 is applied as the other input. The level detector 12 is such that if the output of the amplifier 1 is below a predetermined threshold level, it produces an output to be applied to the gate 7'. When the two inputs coincide, the gate 7' produces an output to terminate the integration and at the same time actuate the printer. The threshold level is set to a level a little higher than the level L in FIG. 9. The threshold level can be used for various other purposes.

In the above embodiment, whether integration is to be terminated is determined by whether the output of the measuring instrument has become lower than a predetermined level. The determination may also depend on whether the apex of a noise peak on the tail of the descending slope of the signal peak has become lower than a predetermined level. Further, the determination may depend on how the levels of the apexes or the end points of successive noise peaks tend to change on the descending slope of the signal peak. This method of determination is effective for example in a case where the fluctuation of the baseline is relatively great while the signal peak exists.

Figure 11:
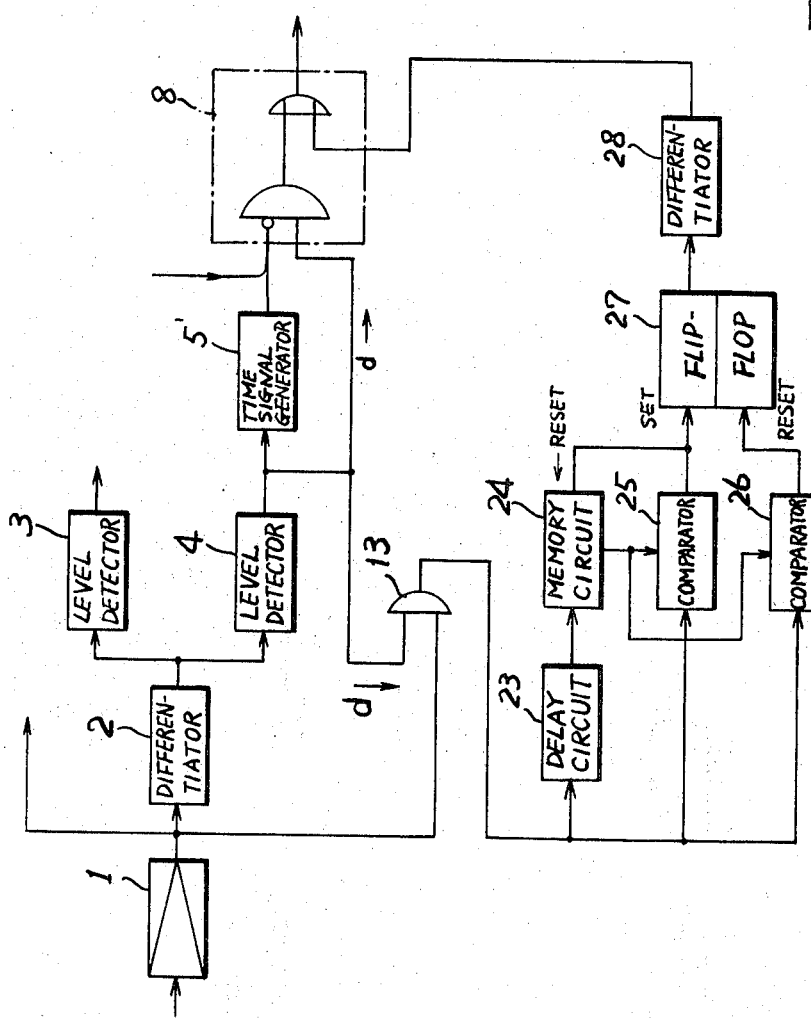
FIG. 11 is a diagram similar to FIG. 10 but showing a modification thereof.

FIG. 11 shows an arrangement wherein the integration is terminated when the end points of successive peak have changed from lowering to rising tendency. In FIG. 11 those circuit components which are not shown are the same as in FIG. 10, except that in FIG. 11 the level detector 12 and the AND gate 7' of FIG. 10 are not required and the output of the gate 8 is directly applied to the integrator and the printer.

In FIG. 11 the output of the amplifier 1 is applied to an AND gate 13 to which the end point detection signal is also applied. When the two inputs coincide, the gate 13 is opened so that the output from the amplifier, that is, the levels of the points a, a' . . . is applied through a delay circuit 23 to a memory circuit 24 to be temporarily stored therein. The output of the gate 13 is also applied directly to a positive comparing circuit 25 and a negative comparing circuit 26, wherein the level of the end point of a peak just detected (as directly sent from the gate 13) is compared with the level of the end point of the preceding peak (as stored in the memory circuit 24). If the level of the preceding end point is higher than that of the present end point, the comparator 25 produces an output to set a flip-flop 27. If the level of the present end point is higher than that of the previous end point, the comparator 26 produces an output to reset the flip-flop 27. Thus so long as the level of the end point of a peak is lower than that of the preceding peak, the flip-flop is set, and when the level of the end point of a peak becomes higher than that of the preceding peak, the flip-flop is reset, whereupon the set output thereof disappears. The trailing edge of the set output as it is disappearing is differentiated by a differentiator 28, the output of which is applied to the gate 8, so that the gate produces an output to terminate the integration and at the same time effect printing of the result of the integration.

The memory circuit 24 is reset by the output of the comparator 25.

What we claim is:

1. An apparatus for integrating the area of a peak in the output of a measuring instrument, and for eliminating the integration of unwanted noise peaks comprising:
    detection signal means for detecting predetermined check points including at least the start point, the apex and the end point of said peak to produce start point, apex and end point detection signals;
    time signal means operable in response to said detection signals to provide at least first, and second, time signals which last for predetermined first and second periods of time;
    integrating means operable in response to said start point detection signal to start integration of the output of said measuring instrument and in response to said end point detection signal to terminate said integration; and
    control means operable in response to said apex detection signal and said first time signal to reset said integrating means when said apex is detected during said first period of time.

2. The apparatus of claim 1, further including inhibit signal means for preventing the operation of said control means when said apex is detected during said second period of time.

3. The apparatus of claim 1 wherein said time signal means provides third and fourth time signals which last for a predetermined third and fourth period of time and further including a second control means operable in response to said end point detection signal and said first, third and fourth time signals, to prevent termination of said integrating operation of said integrating means.

4. The apparatus of claim 1, further including means for detecting the level of said output so that when said output exceeds a predetermined level the resetting operation of said control means is prevented, while when said output has become lower than said predetermined level, the operation of said integrating means is terminated.

5. The system of claim 4, further including means for printing the result of said integration when said integrating operation is terminated.

6. The apparatus of claim 1, further including means for detecting a predetermined point on said output having become lower than a predetermined level to produce a signal, and means operable in response to said last-mentioned signal to terminate said integration.

7. The apparatus of claim 6, wherein said predetermined point is selected from the apex and the end point of a peak.

8. The apparatus of claim 1, further including means for comparing the level of the end point of each peak in said output with that of a succeeding peak to produce an output when the level of the end point of a peak becomes higher than that of the previous peak which was lower than the level of the last peak, and means operable in response to said last-mentioned signal to terminate said integration.

9. An apparatus for integrating the area of a peak in the output of a measuring instrument and for eliminating the integration of unwanted noise peaks, comprising:

detection signal means for detecting predetermined check points including at least the start point, the apex and the end point of said peak to thereby produce start point, apex and end point detection signals;

time signal means operable in response to said detection signals to produce first, second and third time signals which last for predetermined first, second and third periods of time;

integrating means operable in response to said start point detection signal to start integration of the output of said measuring instrument and in response to said end point detection signal to stop said integration; and first control means for preventing the application of said end point detection signal to said integrating means when either the apex detection signal or the end point detection signal is produced during said first, second or third time periods.

10. The apparatus of claim 9 wherein said control means comprises gate means receiving said end point detection signal as an input and one of said time signals as an inhibit input.

11. The apparatus of claim 10 further including means for detecting the level of said output of said measuring instrument to prevent said inhibit input from being applied to said gate means when said output has become lower than a predetermined level.

12. The apparatus of claim 9 further including means connected to said integrating means, and means connecting said printing means to the output of said detection signal means to apply said start point detection to print out the result of said integration at the start point of a succeeding peak.

13. The apparatus of claim 11 wherein said time signal means produces a fourth time signal which lasts for a predetermined fourth period of time and further including second control means to prevent the application of said start point detection signal to said integrating means when said second control means receives said start point detection signal during said second, third or fourth time periods.

14. The apparatus of claim 9 further including means for comparing the level of the end point of each peak in said output with that of a succeeding peak to produce an output to be applied to said integrating means when the level of the end point of a peak becomes higher than that of the previous peak which was lower than the level of the last peak.

* * * * *